US012623174B2

(12) United States Patent
Bergami

(10) Patent No.: US 12,623,174 B2
(45) Date of Patent: May 12, 2026

(54) AIR FILTERING SYSTEM FOR AN AIRCRAFT

(71) Applicant: BMC S.R.L., Medicina (IT)

(72) Inventor: Gaetano Bergami, Medicina (IT)

(73) Assignee: BMC S.R.L., Medicina (IT)

( * ) Notice: Subject to any disclaimer, the term of this patent is extended or adjusted under 35 U.S.C. 154(b) by 422 days.

(21) Appl. No.: 18/519,593

(22) Filed: Nov. 27, 2023

(65) Prior Publication Data

US 2024/0189749 A1 Jun. 13, 2024

(30) Foreign Application Priority Data

Dec. 7, 2022 (IT) ........................ 102022000025191

(51) Int. Cl.
B01D 46/24 (2006.01)
B01D 46/00 (2022.01)
(52) U.S. Cl.
CPC ...... B01D 46/0004 (2013.01); B01D 46/2411 (2013.01); B01D 2271/022 (2013.01)
(58) Field of Classification Search
CPC ............ B01D 46/0004; B01D 46/2411; B01D 2271/022; B01D 46/0005; B01D 46/10; B01D 46/103; B64D 2033/0246; B64D 2013/0651; B64D 13/00; B64D 13/06; B64D 2033/0213; B64D 2033/022; B64D 33/02; F02C 7/055; F02M 35/02416; F02M 35/02491
See application file for complete search history.

(56) References Cited

U.S. PATENT DOCUMENTS

| | | | | |
|---|---|---|---|---|
| 3,354,616 A | * | 11/1967 | Claude .................... | G21F 5/008 55/422 |
| 3,815,754 A | * | 6/1974 | Rosenberg ............. | B01D 35/00 55/497 |
| 4,124,361 A | * | 11/1978 | Revell ................ | B01D 46/0098 55/502 |
| 4,187,182 A | * | 2/1980 | Rosenberg ......... | B01D 46/0004 55/497 |

(Continued)

FOREIGN PATENT DOCUMENTS

| | | |
|---|---|---|
| EP | 0391019 | 10/1990 |
| EP | 3091211 | 11/2016 |

OTHER PUBLICATIONS

Italian Search Report in IT Application No. 202200025191, mailed May 22, 2023 (7 pages) an English Translation attached hereto.

*Primary Examiner* — Dung H Bui
(74) *Attorney, Agent, or Firm* — Leason Ellis LLP

(57) ABSTRACT

An air filtering system having: an air box, which has at least one inlet opening and at least one outlet opening; and an air filter, which is arranged inside the air box. The air box has two opposite twin mounting openings, which are obtained in two parallel and opposite walls of the air box and are shaped to allow the air filter to be inserted and removed through each one of them. Two removable doors are provided, each having an outer panel configured to overlap a respective mounting opening to close the mounting opening and two inner appendages, which project perpendicularly from two opposite ends of the outer panel so as to be arranged on the two opposite sides of the air filter, when the door is coupled to the respective mounting opening.

15 Claims, 5 Drawing Sheets

(56)                    References Cited

U.S. PATENT DOCUMENTS

| | | | | |
|---|---|---|---|---|
| 5,030,264 | A * | 7/1991 | Klotz | F02M 35/024 |
| | | | | 55/502 |
| 5,125,941 | A * | 6/1992 | Ernst | B01D 46/10 |
| | | | | 55/504 |
| 5,236,478 | A * | 8/1993 | Lewis | B01D 46/10 |
| | | | | 55/495 |
| 5,494,497 | A * | 2/1996 | Lee | B01D 46/10 |
| | | | | 55/497 |
| 7,597,735 | B2 * | 10/2009 | Terres | B01D 46/0006 |
| | | | | 55/495 |
| 7,682,416 | B2 * | 3/2010 | Engelland | F02M 35/02416 |
| | | | | 55/480 |
| 8,597,390 | B2 * | 12/2013 | Aizawa | B01D 46/0006 |
| | | | | 55/506 |
| 9,187,860 | B2 * | 11/2015 | Masters | D06F 58/22 |
| 10,279,920 | B1 | 5/2019 | Farrell et al. | |
| 11,318,405 | B2 * | 5/2022 | Campbell | B01D 46/88 |
| 2002/0029549 | A1 * | 3/2002 | Baumann | B01D 46/10 |
| | | | | 55/385.3 |
| 2002/0100263 | A1 * | 8/2002 | Jaroszczyk | B01D 46/121 |
| | | | | 55/482 |
| 2002/0178695 | A1 * | 12/2002 | Poirier | B01D 46/62 |
| | | | | 55/467 |
| 2004/0020177 | A1 * | 2/2004 | Ota | B01D 46/88 |
| | | | | 55/506 |
| 2007/0209517 | A1 * | 9/2007 | Uemura | B01D 46/0036 |
| | | | | 96/135 |
| 2011/0000458 | A1 * | 1/2011 | Muenkel | F02M 35/02483 |
| | | | | 123/198 E |
| 2019/0145655 | A1 * | 5/2019 | Conrad | F24F 7/065 |
| | | | | 165/119 |
| 2021/0215097 | A1 * | 7/2021 | Gons | F02C 7/055 |
| 2021/0318007 | A1 * | 10/2021 | Matho | B01D 46/90 |
| 2021/0354068 | A1 * | 11/2021 | Rickerts | B01D 46/0091 |

* cited by examiner

AIR FILTERING SYSTEM FOR AN AIRCRAFT

CROSS-REFERENCE TO RELATED APPLICATIONS

This patent application claims priority from Italian patent application no. 102022000025191 filed on Dec. 7, 2022, the entire disclosure of which is incorporated herein by reference.

TECHNICAL FIELD

The present invention relates to an air filtering system for an aircraft.

The present invention is advantageously applied to a helicopter, to which the following discussion will explicitly refer without thereby losing generality.

PRIOR ART

A modern helicopter is provided with at least one engine which requires a continuous flow of fresh air for its working; the term engine refers both to the main engines which operate the set of blades and to the auxiliary engines (also called APU—"Auxiliary Power Unit") which operate auxiliary services. With the purpose to supply fresh air to each engine, the helicopter is equipped with at least one air intake which can be provided with a filtering system.

Furthermore, a modern helicopter comprises an air-conditioning system of the cockpit which is equipped with at least one air intake which can be provided with a filtering system.

A filtering system comprises an air box (also called filtering box) which is a container provided, on one side, with an inlet opening through which air to be filtered flows into the air box and, on the opposite side, with an outlet opening through which filtered air flows out of the air box; the air box houses inside it an air filter which is interposed in a sealing manner between the inlet opening and the outlet opening so that the air has to necessarily pass through the air filter in order to flow from the inlet opening to the outlet opening.

Periodically, it is necessary to demount the air filter, i.e. remove the air filter from the air box for controlling the state of the air filter and thus possibly for cleaning or replacing the air filter. Quite frequently, an air box in a helicopter is placed in places that are difficult to access and therefore, in order to simplify the demounting of the air filter, it is necessary to have the possibility for it to be opened on opposite sides in an independent manner.

DESCRIPTION OF THE INVENTION

The object of the present invention is to provide an air filtering system for an aircraft which allows obtaining a rapid and simple opening of the air box on opposite sides and which simultaneously has reduced weight and bulk.

According to the present invention, an air filtering system for an aircraft is provided, according to what is claimed in the appended claims.

The claims describe preferred embodiments of the present invention forming integral part of the present description.

BRIEF DESCRIPTION OF THE DRAWINGS

The present invention will now be described with reference to the accompanying drawings, which illustrate a non-limiting example embodiment thereof, wherein.

PREFERRED EMBODIMENTS OF THE INVENTION

Figure 1:
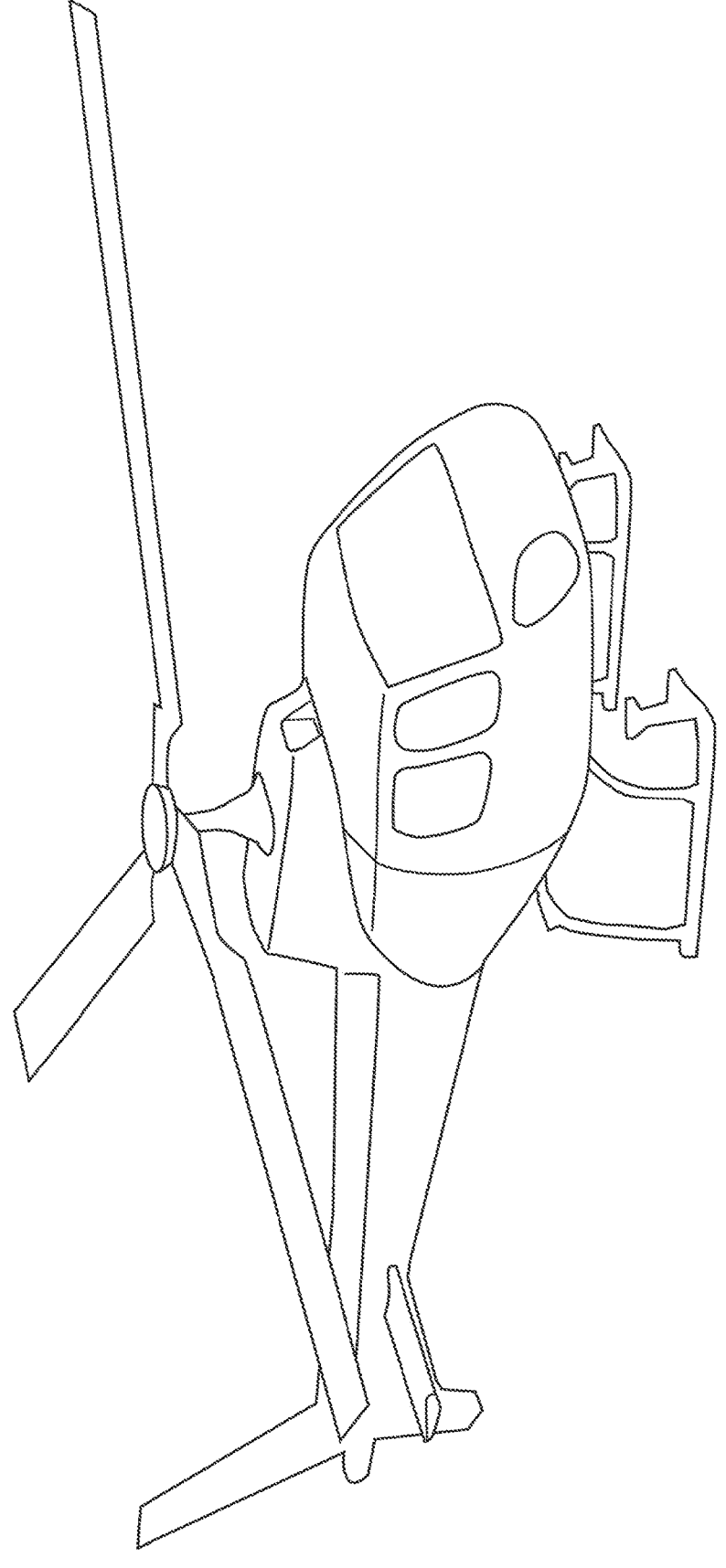
FIG. 1 is a schematic perspective view of a helicopter.

In FIG. 1, reference numeral 1 indicates, as a whole, a helicopter comprising a main engine which operates a set of blades which allow the helicopter to lift and lower vertically, remain still in flight, move laterally, backwards or forwards.

Figure 2:
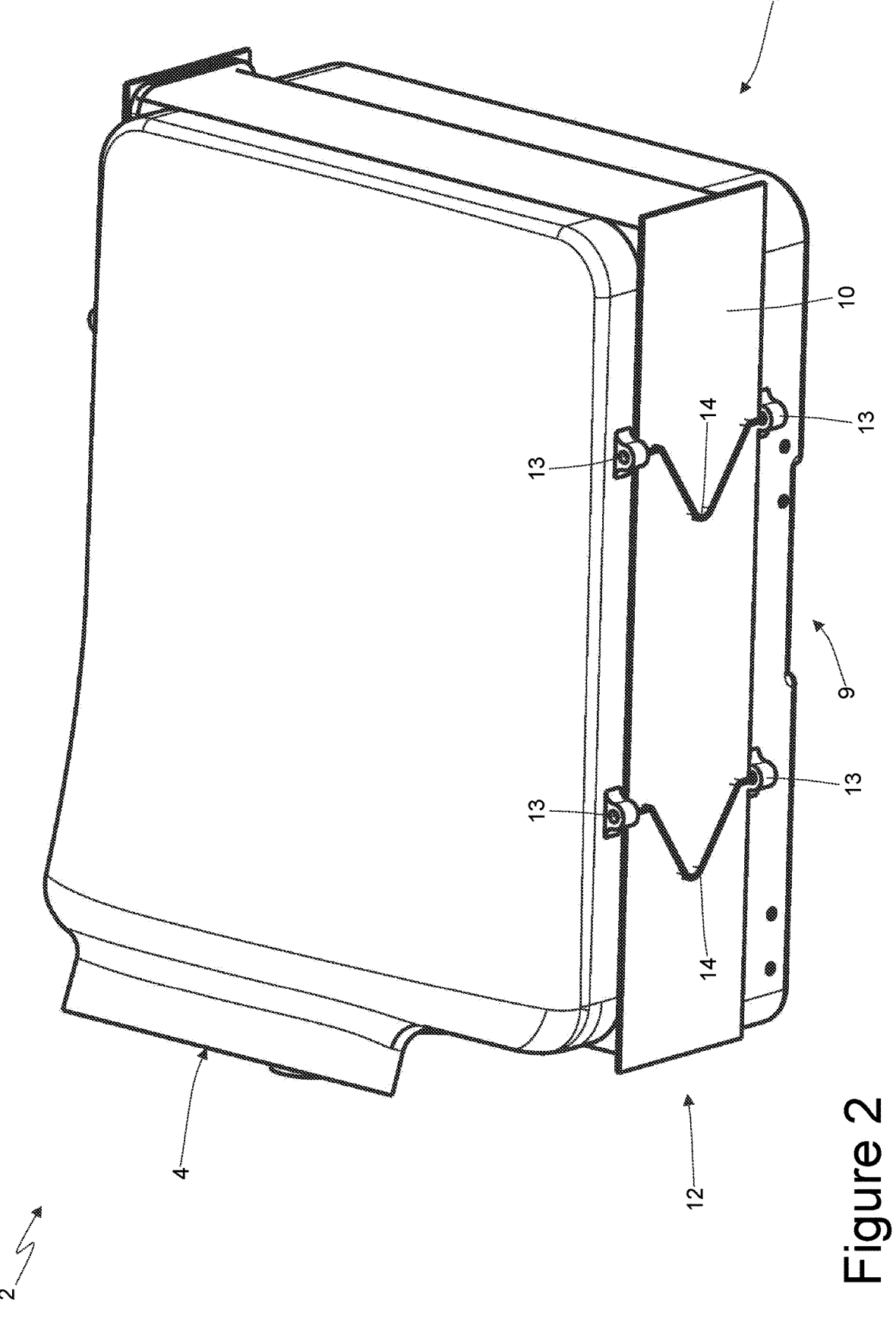
FIG. 2 is a perspective view of an air filtering system of the helicopter of FIG. 1 and manufactured in accordance with the present invention.
Figure 3:
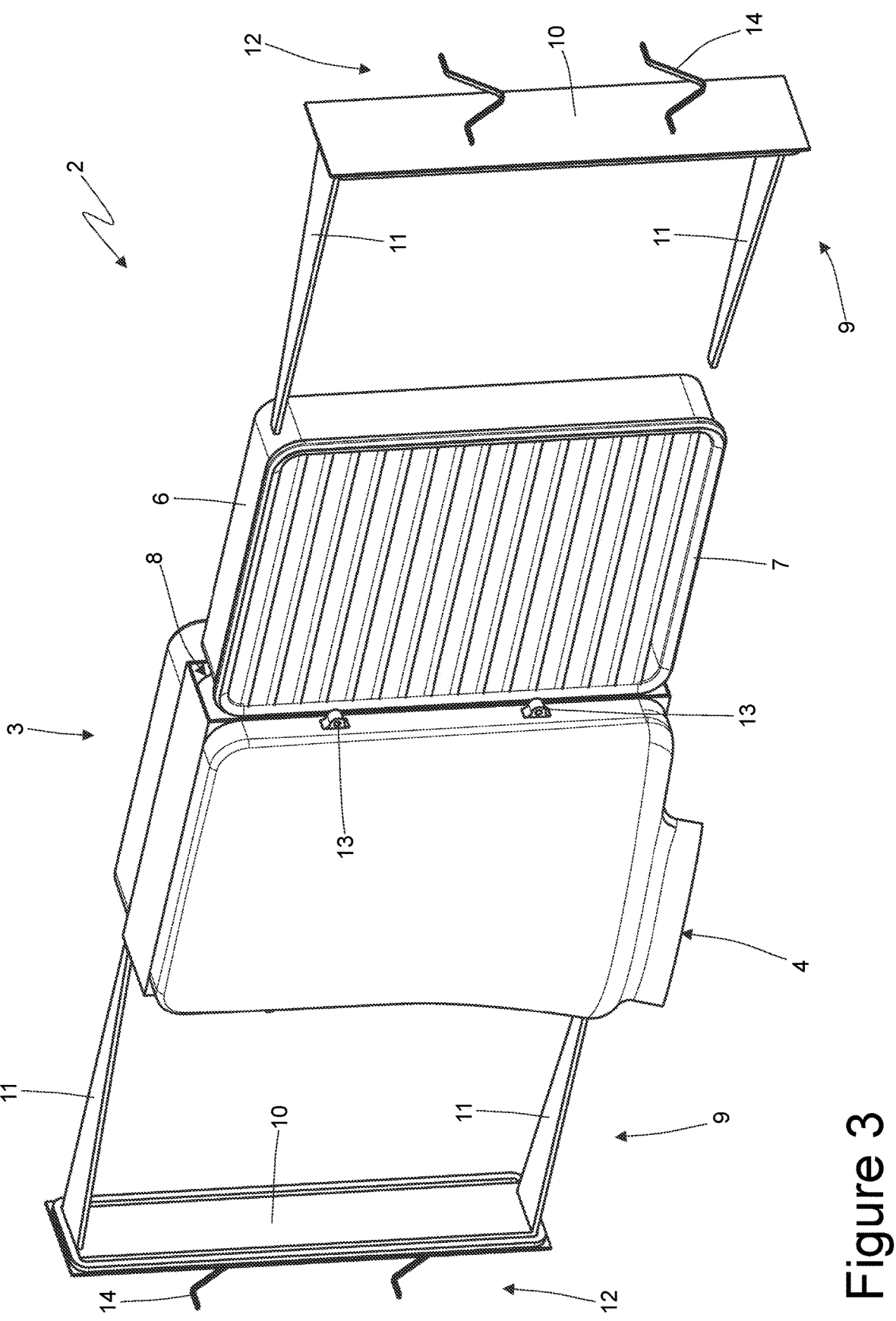
FIG. 3 is an exploded perspective view of the air filtering system of FIG. 2.
Figure 4:
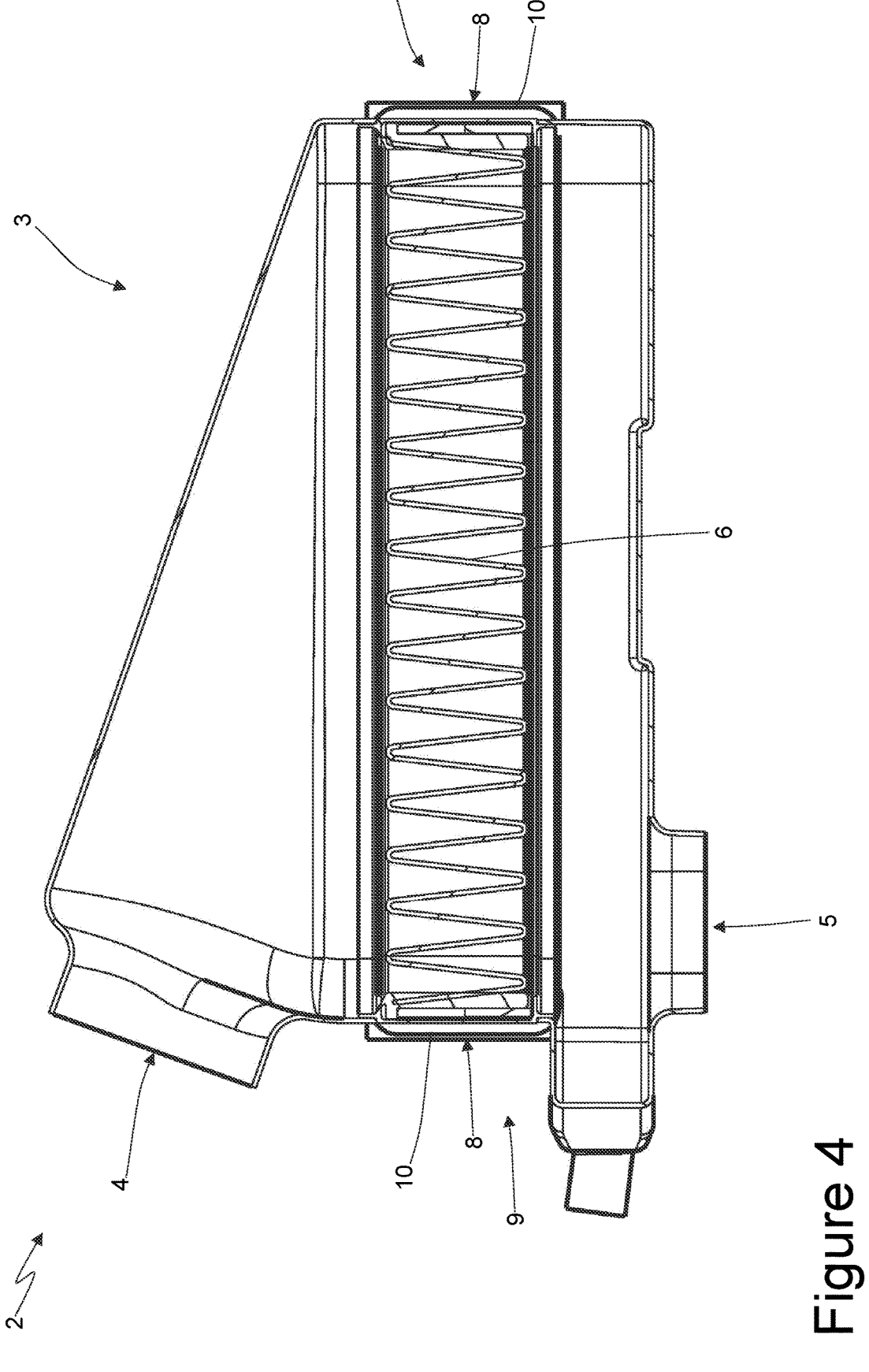
FIG. 4 is a cross-section view of the air filtering system of FIG. 2.

According to what is illustrated in FIGS. 2, 3 and 4, the helicopter 1 comprises an air filtering system 2 which can be utilized for the main engine of the helicopter 1, for an auxiliary engine of an auxiliary power unit (APU), or for an air-conditioning system of the cockpit. In other words, the air filtering system 2 can be utilized in any situation in which it is necessary to suck air from the external environment.

The air filtering system 2 comprises an air box 3 which constitutes an internally hollow container, i.e. which delimits an inner space in which the air which is sucked can circulate. The air box 3 has an (at least one) inlet opening 4 through which air to be filtered flows into the air box 3, and an (at least one) outlet opening 5 through which filtered air flows out of the air box 3. Furthermore, the air filtering system 2 comprises an air filter 6 which is arranged inside the air box 3 and is interposed in a sealing manner between the inlet opening 4 and the outlet opening 5 so that the air has to necessarily pass through the air filter 6 in order to flow from the inlet opening 4 to the outlet opening 5.

The air filter 6 has a circular-looped gasket 7 which is arranged only on one side of the air filter 6 facing the inlet opening 4; the function of the gasket 7 is to guarantee the pneumatic sealing between the air filter 6 and the inner walls of the air box 3 so that the air cannot come out of the sides of the air filter 6 and has to necessarily pass through the air filter 6 for flowing from the inlet opening 4 to the outlet opening 5.

The air box 3 has two opposite twin mounting openings 8 which are obtained in two parallel and opposite walls of the air box 3 and are shaped to allow the air filter 6 to be inserted and removed through each of them; i.e. the air filter 6 can be indifferently inserted or removed through any of the two mounting openings 8 (which are thus redundant with respect to each other).

The air box 3 comprises two removable (movable) doors 9 which allow closing the mounting openings 8. Each door 9 comprises an outer (main) panel 10 configured to overlap a respective mounting opening 8 so as to close the mounting opening 8; furthermore, each door 9 comprises two inner appendages 11, which perpendicularly project from two opposite ends of the outer panel 10 so as to be arranged on the two opposite sides of the air filter 6, when the door 9 is coupled to the respective mounting opening 8, and have a shape that is complementary to the two inner appendages 11 of the other door 9 so as not to overlap the inner appendages 11 of the other door 9, when both doors 9 are coupled to the respective mounting openings 8 (as is well illustrated in FIGS. 5, 6 and 7). Namely, the two inner appendages 11 of a same door 9 embrace on opposite sides the air filter 6 arranged between them.

On each side of the air box 3, the inner appendages 11 of the doors 9 compress (deform) the gasket 7 of the air filter 6 against a sealing edge of the air box 3 of the air filter 6 so as to guarantee the pneumatic sealing; in particular (as is well illustrated in FIGS. 5, 6 and 7), on each side of the air box 3, the sealing gasket 7 of the air filter 6 is in contact only with one single inner appendage 11.

Each inner appendage 11 is shaped like a wedge having an inclined side. Namely, each inner appendage 11 has the shape of a right-angled triangle (with the tip bevelled) having a leg parallel and connected to the respective outer panel 10, a leg perpendicular to the respective outer panel 10, and a hypotenuse forming an acute angle with the respective outer panel 10 and defining the inclined side. In other words, the hypotenuse of each inner appendage 11 defines an inclined side, which faces a similar inclined side of an adjacent inner appendage 11 of the other door 9.

Figures 5, 6, 7:
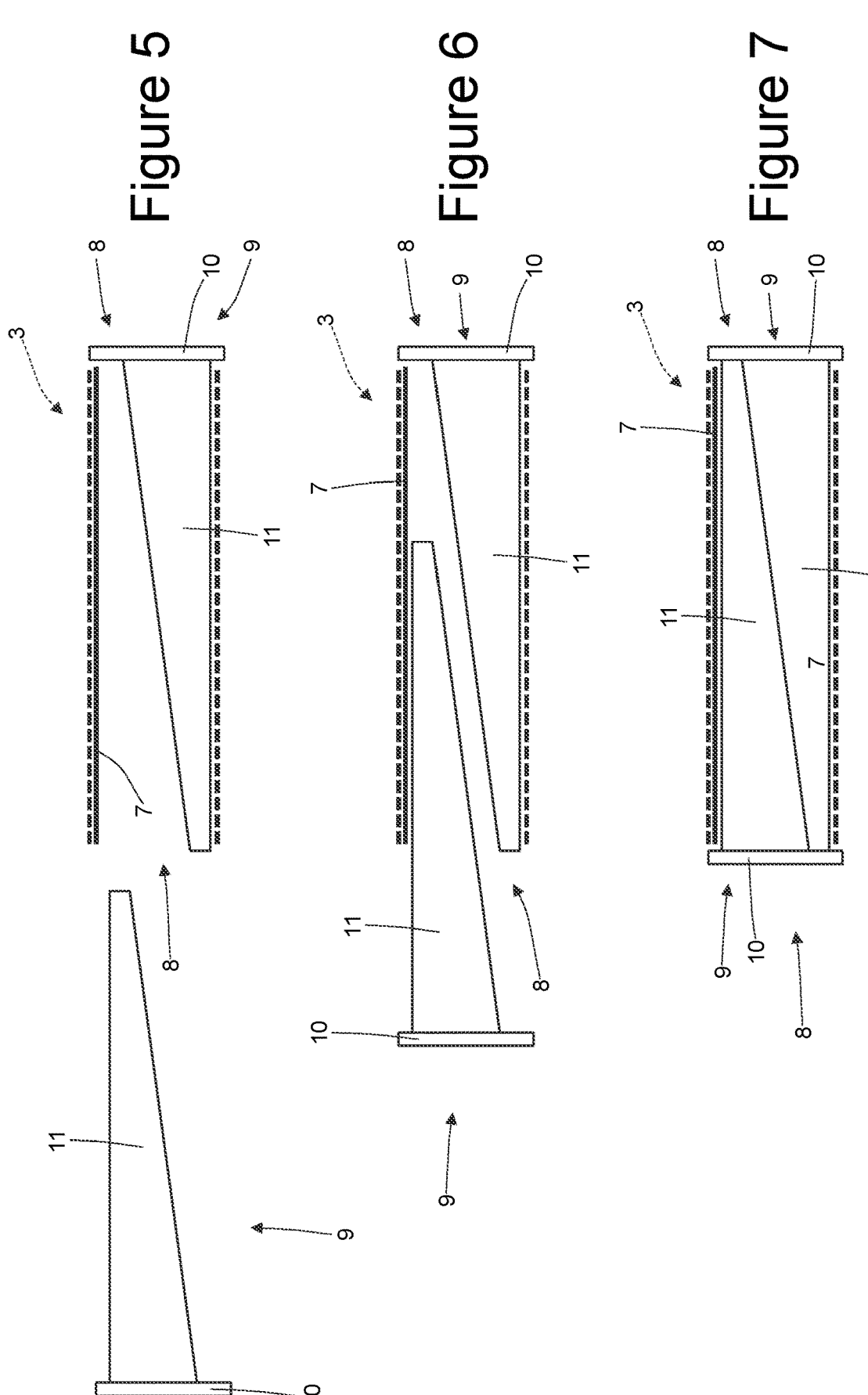
FIGS. 5, 6 and 7 schematically illustrate the coupling of a door to an air box of the air filtering system of FIG. 2.

According to what is better illustrated in FIGS. 5, 6 and 7, on each side of the air box 3, the inclined side of the inner appendage 11 of a door 9 is arranged in a complementary manner to the inclined side of the inner appendage 11 of the other door 9 and therefore the inclined side of the inner appendage 11 of a door 9 slides on the inclined side of the inner appendage 11 of the other door 9 during a relative movement between the two doors 9. The mutual sliding of the inclined sides of the two inner appendages 11 which are on the same side determines the progressive generation of a force (directed transversal to the relative shifting direction of the inner appendages 11) which compresses the gasket 7 of the air filter 6 against the sealing edge of the air box 3.

According to a preferred embodiment illustrated in FIG. 3, the two inner appendages 11 of the same door 9 have opposite orientations so that the inclined side of an inner appendage 11 is opposite the inclined side of the other inner appendage 11 of the same door 9; in this manner, the two doors 9 are completely identical from a constructive point of view and therefore the same door 9 (suitably rotated) can be used indifferently on the right side or on the left side of the air box 3.

According to what is illustrated in FIGS. 2 and 3, the filtering system 2 comprises two fixing devices 12, each configured to connect a door 9 to the air box 3 to prevent the door 9 from being removed from the air box 3 by sliding. Each fixing device 12 comprises two pairs of eyelets 13 present on the air box 3 at the opposite ends of the corresponding mounting opening 8 and two elastic clips 14 (spring clips), each "V"-shaped and configured to engage a pair of eyelets 13.

According to a preferred embodiment, the air filter 6 comprises two holding elements (for example two laces embedded in a frame of the air filter 6) which can be pulled out from two opposite sides of the air filter 6 facing the mounting openings 8; once a door 9 is removed, it is possible to pull out, grasp and pull towards the outside the holding element facing the removed door 9 for easily removing the air filter 6.

FIGS. 5, 6 and 7 schematically illustrate the coupling of a door 9 to the air box 3 (to which the other door 9 was already previously coupled).

The embodiment illustrated by way of example in the illustrated figures relates to a helicopter 1, but the present invention can be advantageously applied to any type of aircraft, therefore also to an airplane.

The embodiments described herein can be combined with each other without departing from the scope of protection of the present invention.

The above-described air filtering system 2 has numerous advantages.

The above-described air filtering system 2 allows obtaining a rapid and simple opening of the air box 3 on opposite sides simultaneously guaranteeing both a firm and precise placing of the air filter 6, and a suitable pneumatic sealing between the inlet opening 4 and the outlet opening 5. In particular, it is simple to obtain a longitudinal compression of the gasket 7 of the air filter 6 against the sealing edge of the air box 3 by simply pushing (by means of the fixing devices 12) on both sides the outer panels 10 of the doors 9 against the air box 3; whereas, the transversal compression of the gasket 7 of the air filter 6 against the sealing edge of the air box 3 (which would normally be more difficult to obtain) is instead effectively produced by the inner appendages 11 which transform the longitudinal thrust into transversal thrust thanks to their double wedge conformation.

Furthermore, the above-described air filtering system 2 has a particularly reduced weight and bulk being composed of few relatively small elements.

Finally, the above-described air filtering system 2 is also simple and cost-effective to manufacture (also thanks to the fact that the same door 9 can be utilized indifferently on the right side or on the left side thus allowing producing one single type of door 9.

LIST OF REFERENCE NUMERALS OF THE FIGURES

1 helicopter
2 filtering system
3 air box
4 inlet opening
5 outlet opening
6 air filter
7 gasket

The invention claimed is:

1. An air filtering system for an aircraft and comprising:

an air box, which has at least one inlet opening, through which air to be filtered flows into the air box, and at least one outlet opening, through which filtered air flows out of the air box; and an air filter, which is arranged inside the air box and is interposed between the inlet opening and the outlet opening;

wherein the air box has two opposite twin mounting openings, which are obtained in two parallel and opposite walls of the air box and are shaped to allow the air filter to be inserted and removed through each one of them; and wherein two removable doors are provided, each comprising an outer panel configured to overlap a respective mounting opening to close the mounting opening;

wherein each door comprises two inner appendages, which project from two opposite ends of the outer panel and are perpendicular to the outer panel so as to be arranged on two opposite sides of the air filter, when the door is coupled to the respective mounting opening, and have a shape that is complementary to the two inner appendages of the other door so as not to overlap the inner appendages of the other door, when both doors are coupled to the respective mounting openings.

2. The air filtering system according to claim 1, wherein, on each side of the air box, the inner appendages of the doors compress a gasket of the air filter against a sealing edge of the air box of the air filter.

3. The air filtering system according to claim 1, wherein, on each side of the air box, a sealing gasket of the air filter is in contact only with one single inner appendage.

4. The air filtering system according to claim 1, wherein each inner appendage is shaped like a wedge having an inclined side.

5. The air filtering system according to claim 4, wherein the two inner appendages of the same door have opposite orientations so that the inclined side of an inner appendage is opposite the inclined side of the other inner appendage.

6. The air filtering system according to claim 4, wherein, on each side of the air box, the inclined side of the inner appendage of a door is arranged in a complementary manner to the inclined side of the inner appendage of the other door.

7. The air filtering system according to claim 4, wherein, on each side of the air box, the inclined side of the inner appendage of a door slides on the inclined side of the inner appendage of the other door during a relative movement between the two doors.

8. The air filtering system according to claim 7, wherein the sliding of the two inclined sides progressively generates a force that compresses a gasket of the air filter against a sealing edge of the air box.

9. The air filtering system according to claim 1, wherein each inner appendage has the shape of a right-angled triangle having a leg parallel and connected to the respective outer panel, a leg perpendicular to the respective outer panel and a hypotenuse forming an acute angle with the respective outer panel.

10. The air filtering system according to claim 9, wherein the hypotenuse of each inner appendage defines an inclined side, which faces a similar inclined side of an adjacent inner appendage.

11. The air filtering system according to claim 1, wherein the two doors are completely identical from a constructive point of view.

12. The air filtering system according to claim 1 and comprising two fixing devices, each configured to connect a door to the air box to prevent the door from being removed from the air box by sliding.

13. The air filtering system according to claim 12, wherein each fixing device comprises at least two eyelets present on the air box at the opposite ends of the corresponding mounting opening and at least one elastic clip, which is "V"-shaped and is configured to engage the two eyelets.

14. The air filtering system according to claim 1, wherein the air filter comprises two holding elements, which can be pulled out from two opposite sides of the air filter facing the mounting openings.

15. A helicopter, comprising the air filtering system according to claim 1.

\* \* \* \* \*